United States Patent [19]

Paice

[11] Patent Number: 5,455,759
[45] Date of Patent: Oct. 3, 1995

[54] SYMMETRICAL, PHASE-SHIFTING, FORK TRANSFORMER

[76] Inventor: Derek A. Paice, 114 Rosewood Ct., Palm Harbor, 34685

[21] Appl. No.: 264,922

[22] Filed: Jun. 24, 1994

[51] Int. Cl.⁶ ............................. H02M 7/00; H02M 7/06
[52] U.S. Cl. ............................. 363/126; 363/129; 363/5; 363/64
[58] Field of Search ........................ 363/1, 2, 5, 125, 363/126, 128, 129, 64, 69, 44–48, 98, 132; 318/177

[56] References Cited

U.S. PATENT DOCUMENTS 4,876,634  9/1989  Paice .............................. 363/5
5,138,544  8/1992  Jessee ............................ 363/43

Primary Examiner—Peter S. Wong
Assistant Examiner—Aditya Krishnan

[57] ABSTRACT

In 12-pulse and 18-pulse AC/DC converter systems a single wye connected auto transformer using appropriate segments of voltage from each phase connected in fork fashion is used to develop 6-phase and 9-phase voltages in a symmetrical manner such that inherent compensation is made for the dc converter output voltage to be within 4.2% of that of a 6-pulse converter. Additional design adjustments for step-up or step-down of voltage can be made without compromising the transformer symmetry. An unconnected but closed delta winding provides a path in which third harmonic currents, and multiples thereof can flow.

6 Claims, 9 Drawing Sheets

I1 = 100%
I3 = 0.15%
I5 = 0.17%
I7 = <0.1%
I11 = 5.4%
I13 = 3.7%
I17 = 0.26%
I19 = <0.1%
I23 = 0.97%
I25 = 0.82%

Table of typical percentage currents in the ac line input Iin

5,455,759

SYMMETRICAL, PHASE-SHIFTING, FORK TRANSFORMER

FIELD OF THE INVENTION

The invention relates to static AC-to-DC converters, such as can be used for AC or DC motors.

BACKGROUND OF THE INVENTION

One main problem with static AC-to-DC converters such as can be used for AC or DC motors is the generation of harmonics on the AC lines, which are caused by the rectification process. Another is cost. The use of transformers and filtering inductances, the rating involved, and power losses, all require a minimizing of components, windings, and rectifying devices without losing the benefits of the overall system. It has been shown in U.S. Pat. No. 5,124,904 of D. A. Paice that an optimized delta transformer connection can mitigate the transformer cost and losses while providing an 18-pulse output. For the purpose of describing the closest art the U.S. Pat. No. 5,124,904 is hereby incorporated by reference.

SUMMARY

Multipulse converters provide an effective way to control harmonic currents drawn by power electronic equipments. Several patents have addressed the need for unique transformer designs, namely:

| U. Meier | # 3,792,286 | Feb. 12, 1974 |
|---|---|---|
| J. Rosa | # 4,255,784 | Mar. 1981 |
| J. Rosa | # 4,366,532 | Dec. 1982 |
| R. Styanyard and Hansruedi | # 4,671,390 | Jun. 9, 1987 |
| D. Paice | # 4,876,634 | Oct. 24, 1989 |
| G. April and G. Olivier | # 5,050,058 | Sep. 17, 1991 |
| D. Paice | # 5,124,904 | Jun. 23, 1992 |
| D. Paice | # 5,148,357 | Sep. 15, 1992 |

This invention relates to a fork, auto transformer connection which with appropriate windings and connections provides power sources for 6-pulse and 18-pulse converters, with automatic voltage reduction to compensate for the higher output inherent in the most effective 12-pulse and 18-pulse circuit connections. Voltage reduction is very desirable in applications, such as variable frequency drives, where the designs operate from industrial 480-V three phase power supplies. In these systems the dc voltage amplitude must be restricted to that which can be tolerated by available economic power switching devices such as IGBTs. Previously patented auto transformer connections such as U.S. Pat. No. 5,124,904 use a main delta winding, and result in higher than desired output voltage. Because of this an additional transformer winding is necessary to step down the voltage. Apart from the physical need of this extra winding, its positioning introduces an asymmetry in the performance which must be accommodated or corrected for best results. The new topologies described here provide automatic voltage reduction without the need for an additional winding and without impairing the transformer symmetry. Computer simulations show that the expected performance matches or exceeds that of previously known 12-pulse and 18-pulse methods.

The invention resides in a three-phase auto transformer with main windings connected in wye and with other windings on each phase used to provide voltages of similar phase but different amplitude. These other voltages are connected in a "fork" manner to provide phase shifts of 30° to develop two six-phase supplies suitable for a 12-pulse converter system or alternatively to provide 40° phase shift to develop a nine-phase supply suitable for an 18 pulse converter connection. To allow third harmonics of current and multiples thereof, to flow, a closed but unconnected set of delta windings of any convenient number of turns is included. The inherent turns ratios necessary to produce the required phase shift also produces a step-down voltage ratio such that the converter dc output voltage is within 4.2% of that obtained from a 6-pulse converter. This means that in most converters for adjustable frequency controllers additional windings are not required to adjust the voltage, however, if such adjustment is desired, for example when an additional regeneration converter is added, it can be achieved in a symmetrical manner. To develop two six-phase supplies the main phase A winding has connected to it two auxiliary windings from phase B to provide vector rotation in a clockwise direction (−120°) and two auxiliary windings from phase C connected to provide vector rotation in a counterclockwise direction (+120°). Similar amplitude and polarity connections are made in a cyclic manner to the other main phases, B. and C. To modify the output voltage amplitude, an additional winding can be connected in series at the point of the main A phase winding furthest from the neutral point N. Depending upon whether the additional winding is inserted in series before or after where the auxiliary windings are connected and to which points the three-phase supply voltage is connected, the amplitude of the six-phase supplies may be either increased or decreased, but in any event symmetry is maintained such that currents and impedance remain balanced. This enables the practical leakage impedances of the transformer to be balanced such that additional trimming components are unnecessary. In another embodiment of the invention a nine-phase supply is obtained suitable for powering an 18-pulse converter. For a nine-phase supply the phase A main winding is tapped. At its end furthest from neutral is joined one auxiliary winding from phase B connected to add a fraction of voltage at −120° and one auxiliary winding from phase C connected to include a fraction of voltage at +120°. If desired an additional winding can be added to the main windings on phases A, B, and C to adjust the voltage amplitude in a symmetrical manner either increasing or reducing the voltage amplitude depending on where the supply source is connected. This additional winding may also be used to supply higher voltage as a means to improve performance under regeneration of the AC/DC converter in a manner well known to those skilled in the art.

For a different sequence of the three-phase power supply i.e. rotation A,B,C instead of A,B,C, applied to the embodiments described above the auto-connected phase-shifting transformer connections remain the same, but the relative phase position of the output voltages will change, without detriment to the performance and function of the AC/DC converter.

DESCRIPTION OF THE INVENTION

The invention relates to multipulse converter arrangements of the 12-pulse and 18-pulse types using a special fork connected auto transformer with appropriate phase shift and conduction angle which eliminates the need for interphase transformers and provides a symmetry such that step up or step down voltages can be obtained without causing unbalance effects. This arrangement when combined with appropriate AC line reactances, or with appropriately designed transformer leakage reactance, leads to reduction of harmonic currents such that equipments can easily meet prevailing harmonic distortion specifications. The decision to use 12-pulse or 18-pulse is a matter of system and equipment design trade-offs. The final approach rests upon the observation that higher order harmonic frequencies have frequency of $(kq\pm1)$ with amplitudes of $1/(kq\pm1)$ where q is the pulse number, and k is any integer. A similar transformer with fork winding construction is used for 12-pulse and 18-pulse cases, but with different turns ratios and winding sections. U.S. Pat. No. 5,124,904 achieves similar excellent harmonic reduction results, but due to an inherent increase of about 10.3% in the dc output voltage it has the disadvantage in most cases of requiring an additional winding rated at full current to step down the voltage to be within 5% of the dc voltage corresponding to a three-phase bridge converter. The new fork transformer overcomes this disadvantage and inherently provides a converter dc output within 4.2% of a three-phase bridge converter.

In common with U.S. Pat. No. 5,124,904 there is no need for an interphase transformer and for providing a neutral reference point between the converter bridges, also the transformer rating is less than that of the load.

Figure 2:
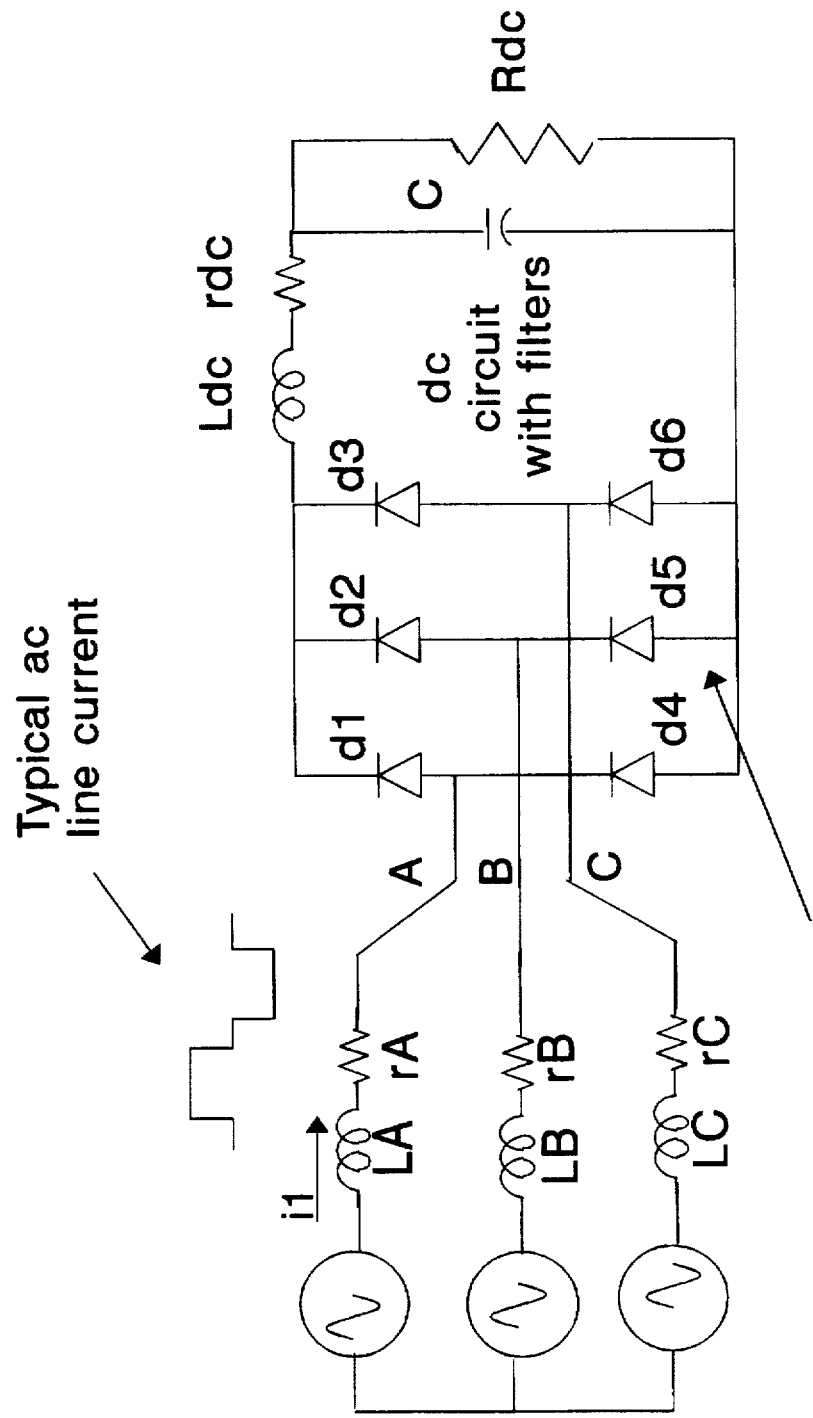
FIG. 2 shows a basic three-phase bridge converter which is well known to those in the electronics industry. The ac input line current contains many harmonics which limits the converter application.

Referring to FIG. 2 a basic three-phase rectifier bridge is shown in which 6 diodes are connected to a three-phase supply and a dc circuit incorporating a load and dc filter components. The open circuit dc output voltage from this circuit is given by:

$$V_{do}=2.34\ V_{AAN}$$

The line current harmonics of this circuit under load are at harmonic frequencies of the form $(6k\pm1)$ and with amplitude $1/(6k\pm1)$, where k is any integer.

Figure 3A:
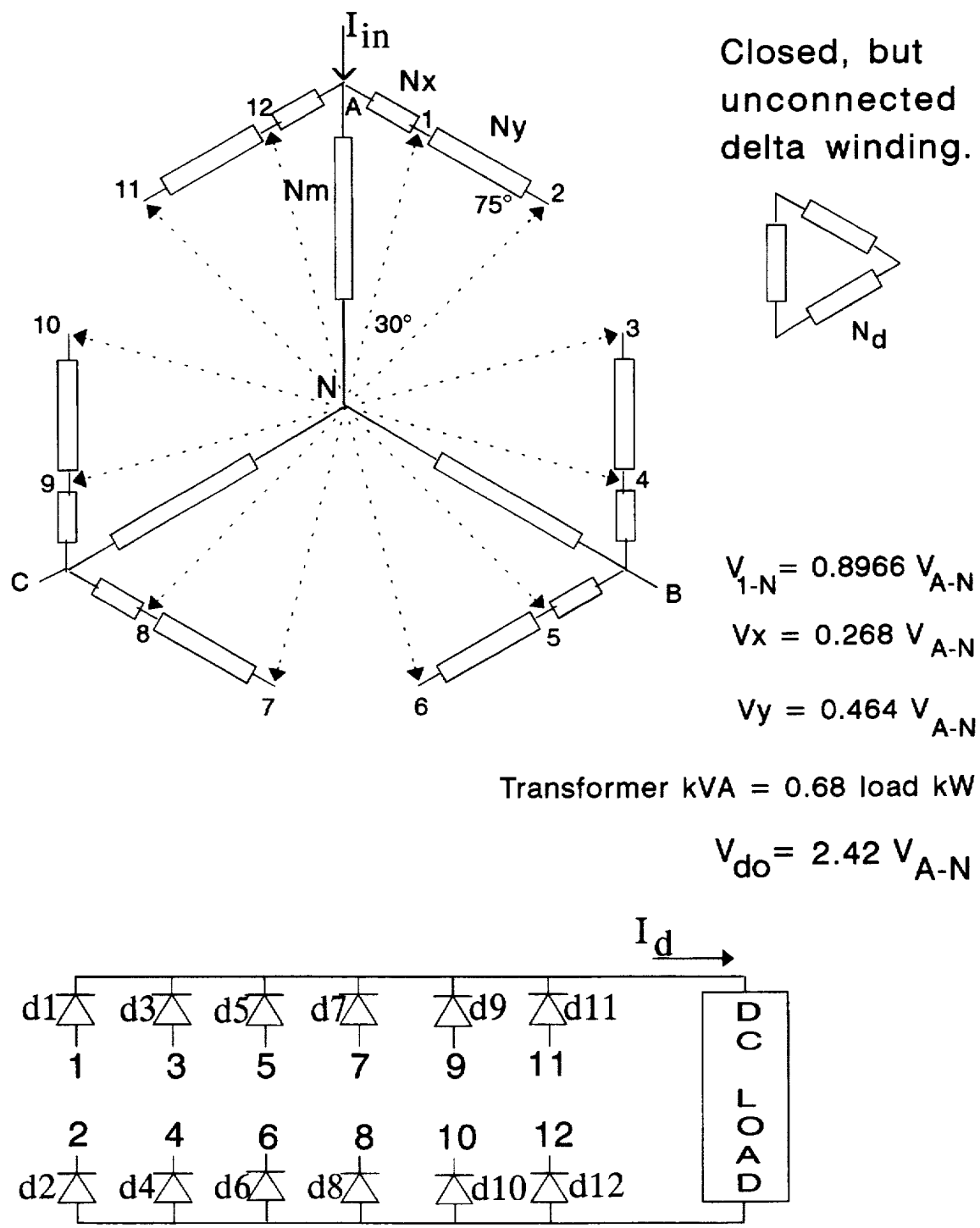
FIGS. 3A and 3B show an embodiment of this invention applied to a 12-pulse rectifier with inherent voltage step down and a dc output voltage only 3.4% higher than that of a 6-pulse rectifier. The available three-phase supply voltage is applied to terminals A, B, and C. Auxiliary windings such as $N_x$ and $N_r$ provide outputs with appropriate phase shift and amplitude.
Figure 3B:
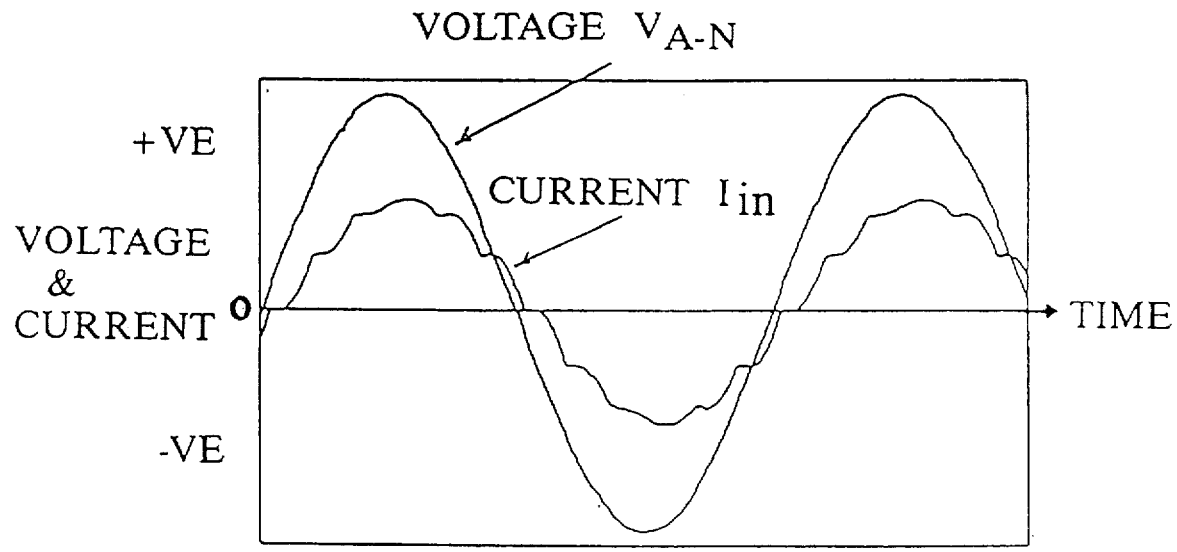

FIGS. 3A and 3B show a basic arrangement of a 12-pulse symmetrical fork transformer arrangement and computer calculated results for the ac line currents of the form $I_h$ where h is the harmonic number.

Referring to FIGS. 3A and 3B, a three-phase power source is applied to terminals A, B, and C. This generates 12 ac outputs, numbered 1 through 12, suitable for powering a 12-pulse converter. The transformer windings are shown as blocks. Each phase of the transformer comprises a main winding $N_m$, two auxiliary windings $N_x$, two extender windings $N_y$, and one delta winding $N_d$. The delta winding can have any convenient number of turns. The object of the invention is to establish unique ratios between $N_m$, $N_s$, and $N_y$ to give the desired characteristics. Outputs such as $V_{1-N}$, $V_{2-N}$, etc. are all equal in amplitude.

From the geometry of FIGS. 3A and 3B we determine:

$$N_x/\sin 15° = N_m/\sin 105° \text{ thus } N_x=0.269\ N_m \quad (1)$$

$$(N_x+N_y)/\sin 45° = N_m/\sin 75° \text{ thus } N_y=0.464\ N_m \quad (2)$$

Using the desirable ratios, given in equations (1) and (2) the output voltages such as $V_1$ are given by:

$$V_o=0.8965\ V_{A-N}$$

The converter open circuit dc output voltage, $V_{do}$, is given by:

$$V_{do}=2\sqrt{2}\ V_o\ (3/\pi) \int \cos\ wt\ dwt \text{ over the range } (-\pi/6) \text{ to } (\pi/6)$$

from which $V_{do}=2.7\ V_o$
and $$V_{do}=2.42\ V_{A-N}$$

In a straight-through three-phase bridge converter connection without transformer, such as used in the ubiquitous variable frequency drive, and shown in FIG. 2 the open circuit dc output voltage is given by:

$$V_{do}=2.34\ V_{A-N}$$

Figure 4:
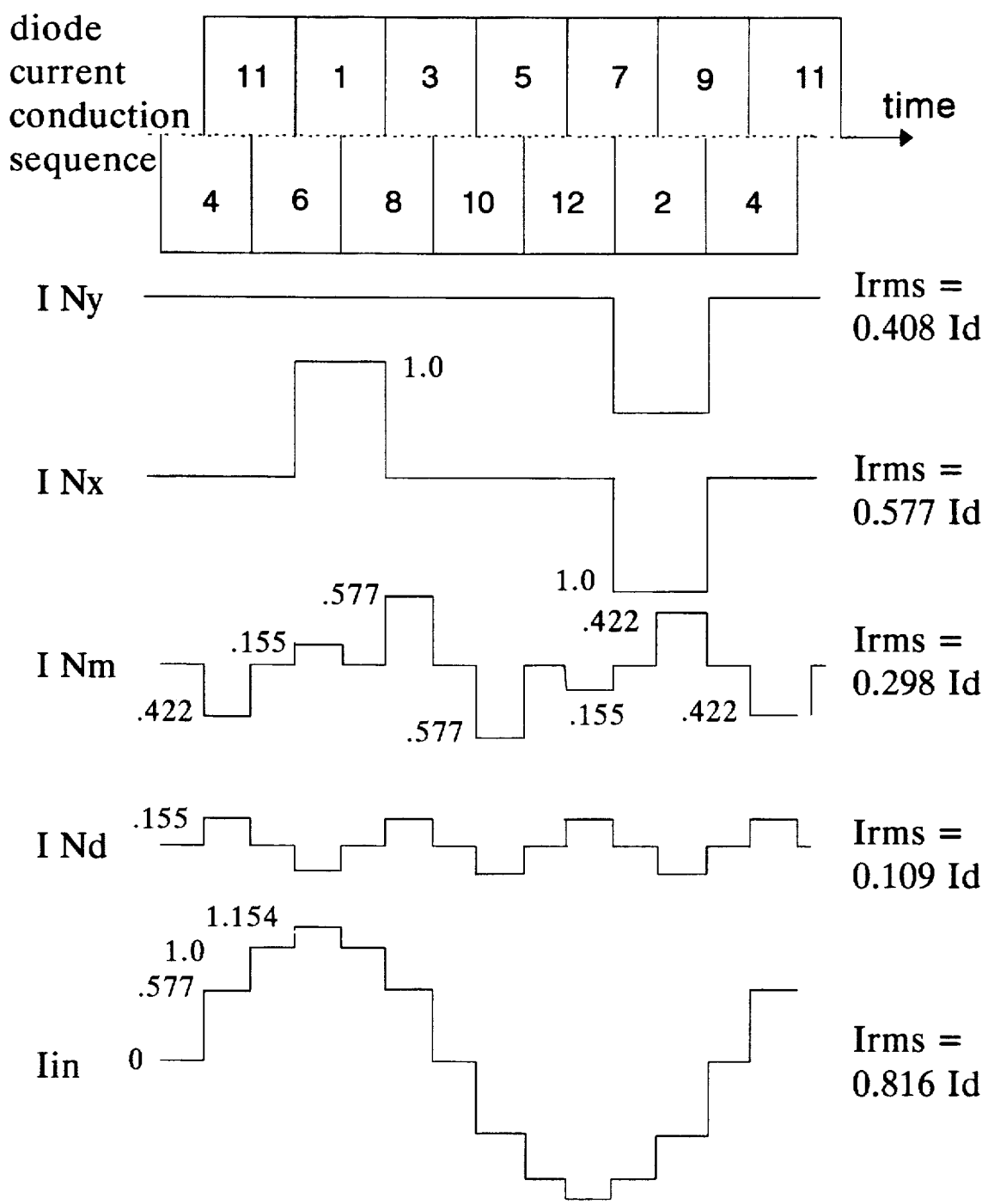
FIG. 4 shows theoretical waveforms applicable to the symmetrical fork transformer in a 12-pulse converter.

Thus the proposed 12-pulse arrangement has a dc voltage which is only 3.4% greater than a straight through connection. This is easily tolerated in most practical designs. Further, it allows for the inclusion of additional ac line reactance to filter and reduce the residual harmonic currents. Typical ac line current waveforms are shown in FIGS. 3A and 3B. FIG. 4 shows idealized theoretical waveshapes of current in the 12-pulse version of the new fork transformer.

Figure 5:
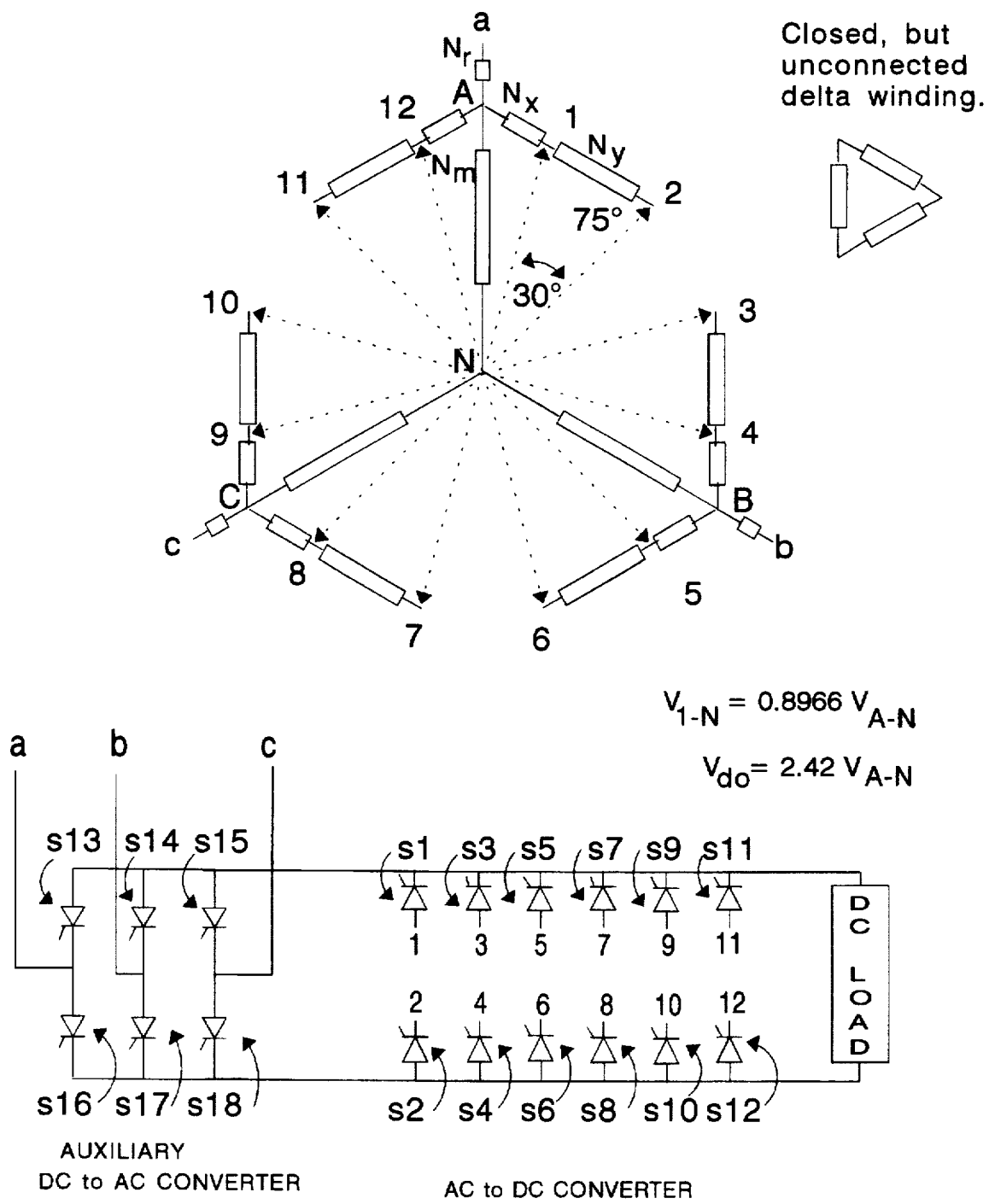
FIG. 5 shows an embodiment of this invention applied to a 12-pulse rectifier with voltage adjustment and connections for regeneration. Auxiliary winding $N_r$ provides a higher voltage value at terminal "a" to which an auxiliary 6-pulse converter for regeneration power is connected.

FIG. 5 shows application of the new 12-pulse transformer with a symmetrical overwind coil $N_r$ to supply power for a regeneration converter. For reliable regeneration performance, i.e., dc to ac power flow, it is essential to ensure satisfactory commutation of the thyristors under inverting conditions. To achieve this it is known to use a step-up transformer to raise the voltage applied to by appropriately sizing the extra winding $N_r$ on the fork the inverting bridge by about 15%. This is very readily achieved transformer. A complete scheme for regeneration is shown in FIG. 5. In this figure the inverting bridge is shown in a 6-pulse arrangement. The extra harmonic currents associated with 6-pulse conversion should not be a concern for loads with intermittent regeneration requirements, however, where the regeneration feature is a large part of the duty cycle an option is known to obtain 12-pulse regeneration by using a method which reverses the dc link voltage. In this case the extra coil $N_r$ is not required.

Figure 6:
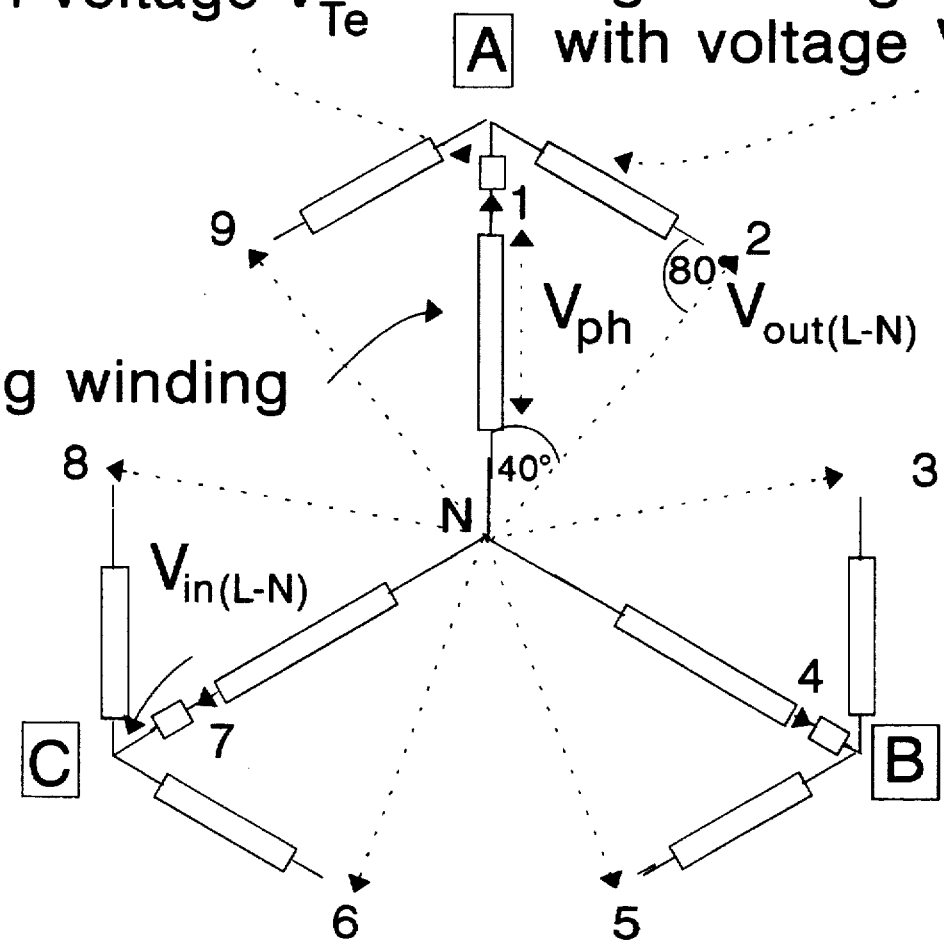
FIG. 6 shows an embodiment of the symmetrical fork transformer applied to an 18-pulse rectifier with inherent voltage step down and a dc output only 4.2% higher than that of a 6-pulse converter. An auxiliary "teaser" winding provides a step-down of voltage like a tapping on the main "long" winding.

FIG. 6 shows the symmetrical fork transformer connected to produce a nine phase supply suitable for powering an 18-pulse converter. The three-phase input is connected to terminals A, B, and C, and the nine outputs which are at a slightly lower voltage are numbered 1 through 9. In this figure the windings on the symmetrical fork transformer are given a different terminology to those on the 12-pulse arrangement for the purposes of discussion. Solving for the geometry of the voltage vectors in FIG. 6 it is determined that for an 18-pulse converter the open circuit dc output voltage is given by:

$$V_{do} = 2.44 \, V_{L-N}$$

where $V_{L-N}$ is the line to neutral voltage of the three-phase power source applied to terminals A, B, and C. Thus the dc output is only 4.2% greater than that provided by a straight-through three-phase bridge connection.

Figure 7A:
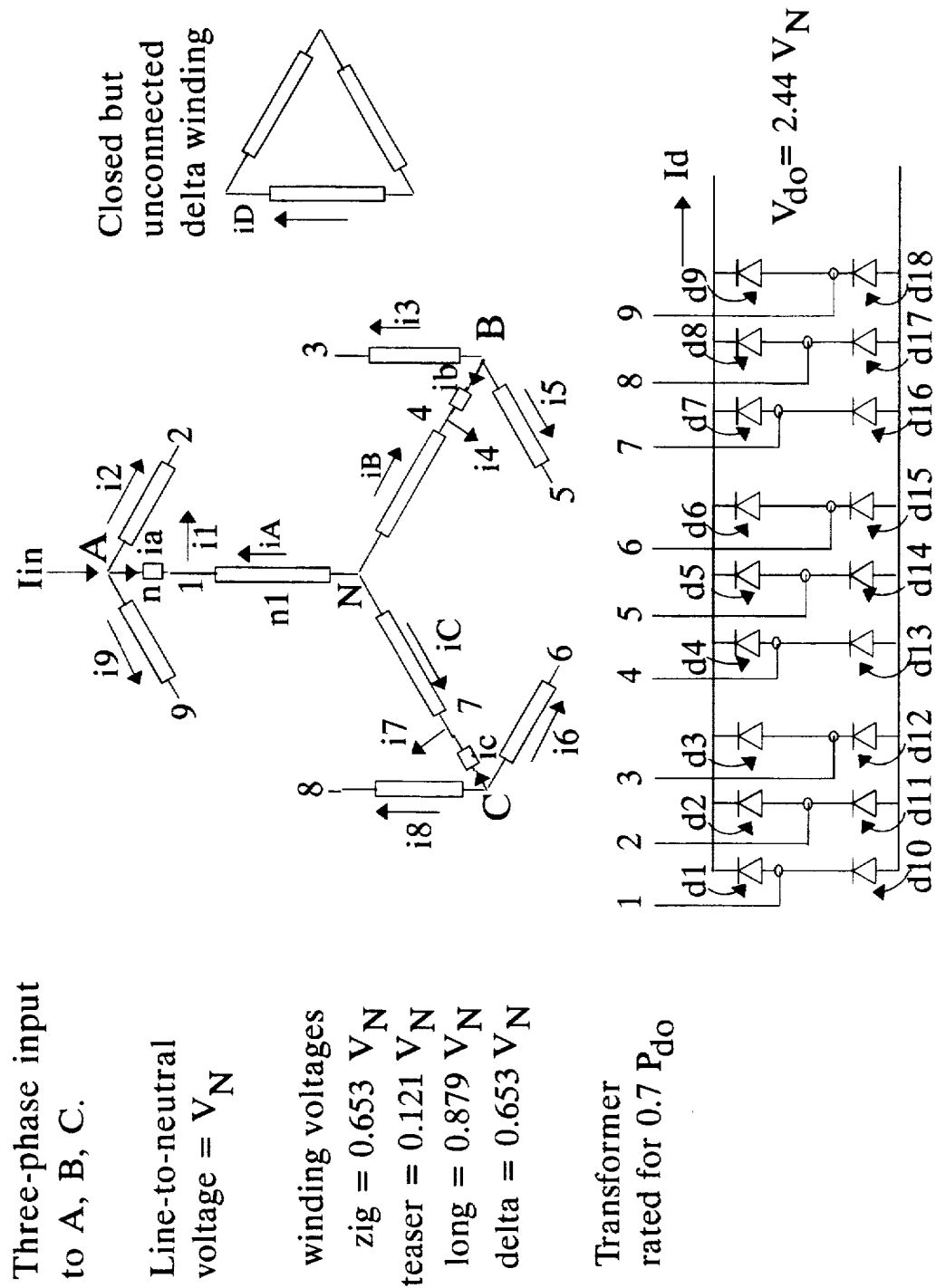
FIGS. 7A and 7B show waveshapes applicable to the symmetrical fork transformer applied to an 18 pulse converter.
Figure 7B:
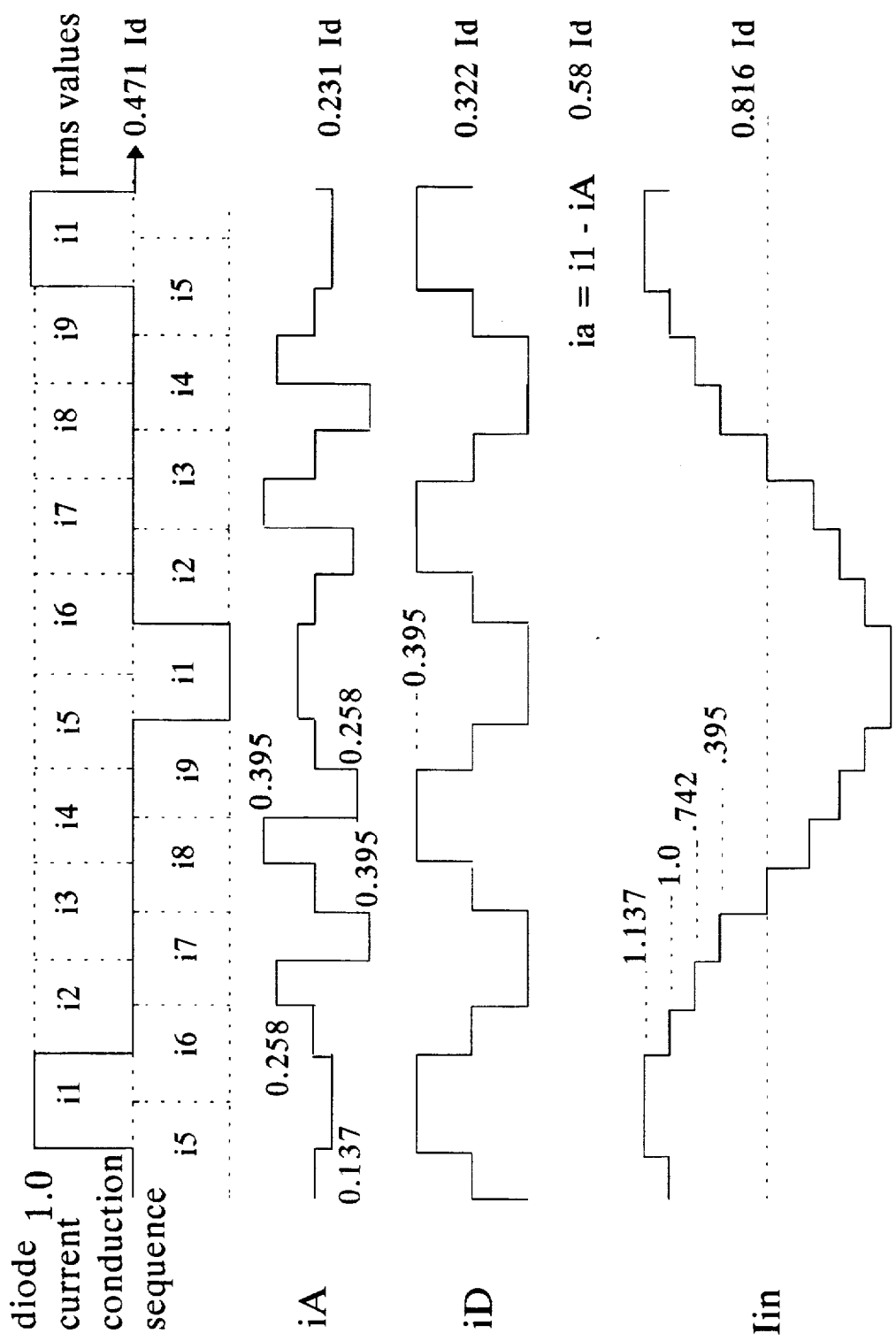

FIGS. 7A and 7B show complete idealized waveforms of current in the 18-pulse connection.

Practical transformer turns must be integer values. Some practical turns for equipments up to 480-V, 500-kW rating are shown in Table 1 for 12-pulse converters and Table 2 for 18-pulse converters.

TABLE 1

Practical Examples of Turns for the 12-Pulse Auto Fork Transformer.

| $N_m$ MAIN | $N_y$ EXTENDER | $N_x$ AUXILIARY |
|---|---|---|
| 26 | 12 | 7 |
| 41 | 19 | 11 |
| 56 | 26 | 15 |

TABLE 2

Practical Examples of Turns for 18-Pulse Fork Transformer.

| Zig winding | 16 | 22 | 60 | 97 |
|---|---|---|---|---|
| Teaser winding | 3 | 4 | 11 | 18 |
| Long winding | 22 | 29 | 80 | 131 |
| Amplitude error | −0.3% | −0.35% | +0.16% | −.012% |
| Phase error | −0.8° | +0.893° | +0.425° | −0.11° |

Figure 1:
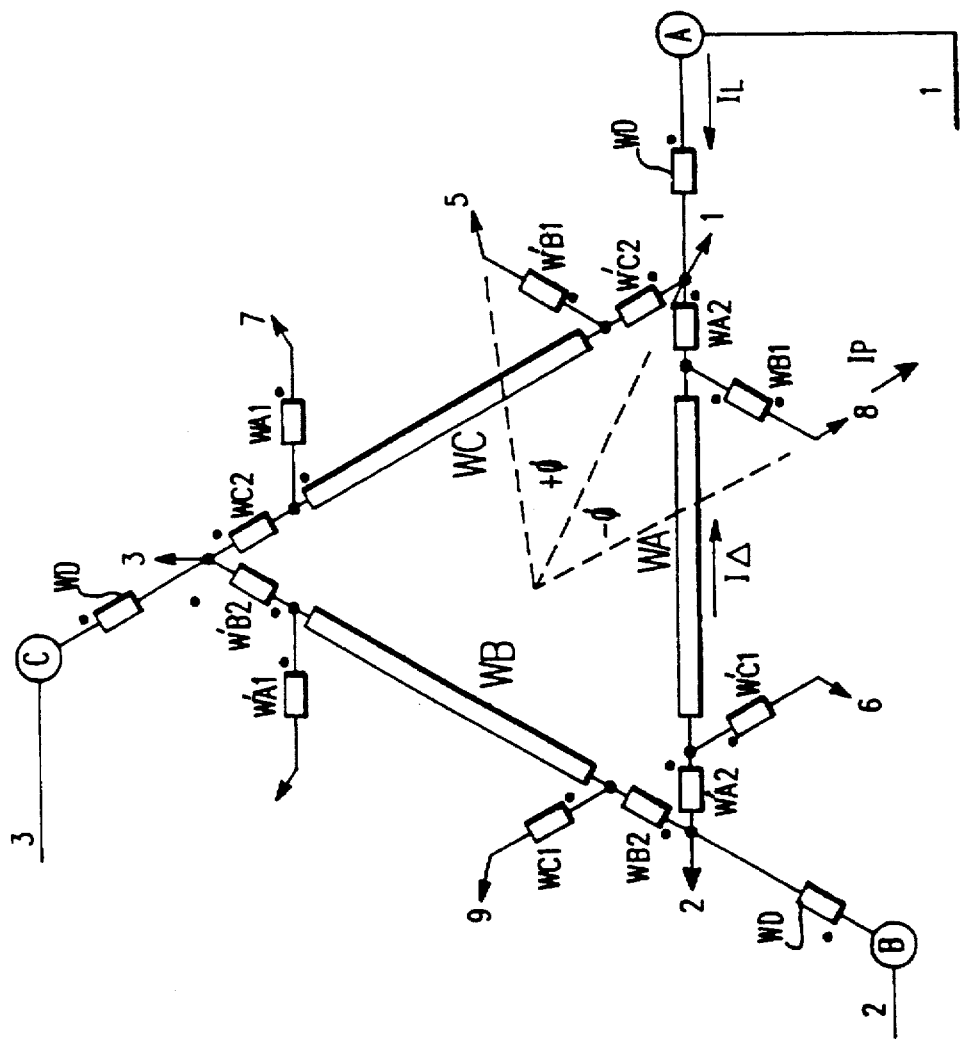
FIG. 1 shows the prior art in the form of an auto transformer with delta type connections which produces a nine-phase supply suitable for 18-pulse converters, as described in U.S. Pat. No. 5,124,904.

It will be apparent to those skilled in the art that the same winding topology shown in FIGS. 1 and 2 can be used if the power source is applied to the delta windings. By these means the same optimum features are retained but the dc isolation associated with double-wound transformers is provided. In this case there is no inherent restriction on the range of output voltage available.

What is claimed is:

1. A multiple AC/DC converter system comprising a three-phase wye connected transformer having a minimum of five windings on each phase with two windings being connected in series to provide a tapped coil in which the end of the coil electrically furthermost from the tapping is connected to form a neutral with the same coils from another phase; with the end electrically closest to the tapping on each phase being connected to one of the three power source lines, with the same connections on the other phases such that each of the lines of the three phase source are connected to each transformer phase; with one winding from each phase being connected in series with the same winding from each of the other phases to produce a closed delta connection with two equal turn windings on each phase; with one winding having one end connected in a counterclockwise fashion to the power input terminals of the next phase measured in a clockwise direction; with the other winding having one end connected in a clockwise fashion to the next power input terminal measured in a counterclockwise sense.

2. The system of claim 1 wherein the winding electrically connected to the neutral is called the LONG winding; the winding connected to the end of the long winding is called the TEASER winding; other windings connected to the point of contact between TEASER winding and the supply are called ZIG windings; wherein the number of turns per phase for LONG, TEASER, and ZIG windings are in the ratio of 22:3:16, or 29:4:22, or 80:11:60, or 131:18:97 respectively.

3. The system of claim 2 whereby nine equal amplitude voltages of predetermined magnitude and phase angle with respect to the voltage applied by the power supply exist at the junction of TEASER winding and LONG winding, and at the ends of ZIG windings remote from the power supply terminals; whereby each voltage point is connected to the center point of a separate pair of series connected semiconductor rectifying elements in which the anode of one element is connected to the cathode of another element; there being nine such voltages and nine such pairs of rectifying elements; the unconnected anodes of each rectifier pair are joined together to provide a negative output terminal; the unconnected cathodes of each rectifier pair are joined together to provide a positive output terminal.

4. A multiple AC/DC converter system comprising a three-phase wye connected transformer having a minimum of six windings on each phase; with one winding on each phase connected at one end to one phase of the power supply with the other end being connnected to identical windings on the other phases to form a neutral point; with such windings being described as a "MAIN" winding; with one winding from each phase being connected in series with one similar winding from each of the other phases to produce a closed delta connection; with two other windings on the same phase but of different turns being connected in series to form a pair windings; with the shorter of such windings being called an AUXILIARY winding and the longer an EXTENDER winding; with the end of the AUXILIARY winding not joined to the EXTENDER winding being connected to the junction joining a "MAIN" winding to the power supply; with two similar pairs of such windings on each phase; with one pair having the end of the auxiliary winding not connected to the extender winding connected in a counterclockwise fashion to the power input terminals of the next phase measured in a clockwise direction; with the other pair having the end of the auxiliary winding not connected to the extender winding connected in a clockwise fashion to the next power input terminal measured in a counterclockwise direction.

5. The system of claim 4 wherein the number of turns per phase fo MAIN, AUXILIARY and EXTENDER windings are in the ratio of 26:7:12 or 41:11:19 or 56:15:26 respectively.

6. The system of claim 5 whereby twelve equal amplitude voltages of predetermined magnitude and phase angle with respect to the voltage applied by the power supply exist at the junction of AUXILIARY and EXTENDER windings, and at the ends of EXTENDER windings remote from that junction; whereby considering the twelve voltages in either clockwise or counterclockwise direction in sequence the first and then every other one voltage is connected to the cathode of a rectifying device; whereby the second and then every other one voltage is connected to the anode of a rectifying device; with all the anodes not connected to a winding being joined together to provide a negative terminal; with all the cathodes not connected to a winding being joined together to form a positive terminal.

* * * * *